United States Patent Office 2,979,470
Patented Apr. 11, 1961

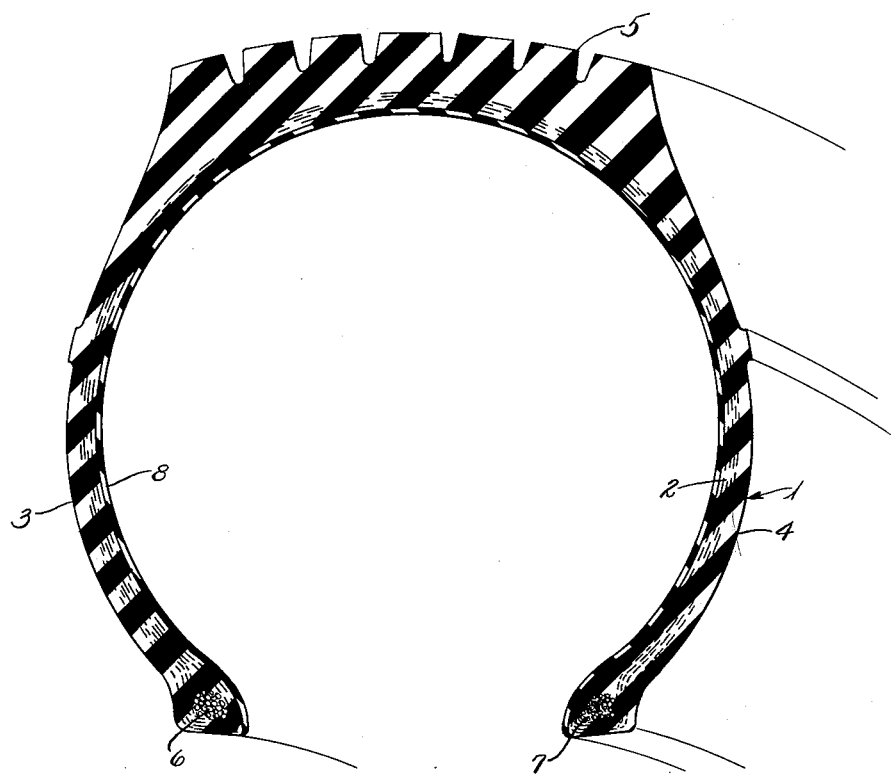

2,979,470

TUBELESS TIRE INNERLINER

Alvin W. Warren, Akron, Ohio, assignor to The Firestone Tire & Rubber Company, Akron, Ohio, a corporation of Ohio Filed Aug. 10, 1955, Ser. No. 527,449

3 Claims. (Cl. 260—5)

This invention relates to a new composition of matter and more particularly to a rubbery composition satisfactory for use as an air impervious rubbery innerliner adhered to the inside of a tubeless tire casing from bead to bead to prevent the escape of air from the tire.

An innerliner for tubeless tires conventionally comprises butyl rubber either alone or mixed with other rubbery polymeric materials in a thin vulcanized sheet adhered to the inner peripheral surface of the tire and extending from bead to bead. Butyl rubber is essentially a copolymer of from 80 to 99.5% of an isoolefin having from 4 to 8 carbon atoms with from .5 to 20% of a conjugated diolefin copolymerized at a low temperature in the present of a Friedel-Crafts catalyst such as aluminum chloride. The function of such an innerliner is to make the tire casing an air container without the necessity of a pneumatic tube. Innerliners of butyl type rubber adhere poorly after vulcanization to the other adjacent rubbery components normally used in pneumatic tires. For this reason, the butyl innerliner often separates from the inner peripheral surface of the tire during road operation to allow air to penetrate and destroy the tire body.

The present invention provides an improved innerliner comprised of a mixture of natural rubber and certain other rubbery polymeric materials loaded with a novel combination of clay and carbon black.

It is therefore an object of the invention to provide an improved innerliner composition for a tubeless tire; to provide an improved innerliner for a tubeless tire and to provide an air retaining liner for a tubeless tire comprised of natural rubber and other rubbery polymeric material in combination with high loading of carbon black and clay.

These and other objects will be apparent with reference to the specification, claims and drawing which is a sectional view partially in perspective of a tubeless tire showing the features of the invention.

Referring now to the drawing, a tire generally indicated at 1 is comprised of a fabric reinforced casing 2 to which is bonded by vulcanization sidewall portions 3 and 4 and tread portion 5, these portions being of conventional rubbery compounds. The fabric casing 2 terminates at each edge in annular bead portions 6 and 7 and is provided across its radial inner peripheral surface with an air retaining innerliner 8 bonded thereto from bead to bead and comprised of the novel rubbery composition.

In the preferred form of the invention, the novel innerliner of the invention is comprised of natural rubber mixed with synthetic rubber, preferably a copolymer of butadiene and styrene commercially termed GR-S. In view of the invention, a rubbery composition was compounded according to the following formula, all parts hereinafter [1] based on 100 parts by weight rubber hydrocarbon:

| | |
|---|---|
| Natural rubber | 58 |
| GR-S (synthetic rubber) [2] | 25 |
| Whole tire reclaim [3] | 36 |
| Medium thermal carbon black | 45 |
| Clay | 65 |
| Zinc oxide | 3 |
| Stearic acid | 2 |
| Sulfur | 2.3 |
| Softener | 8 |
| Accelerator | 1.9 |
| | 246.2 |

[1] Including the claims.
[2] Copolymer of butadiene and styrene.
[3] Containing 45–50% by weight of rubber hydrocarbon, the rubber hydrocarbon being a mixture of natural rubber and GR-S.

The rubber stock was prepared by mixing the rubbery polymers together with the reclaim, carbon black, clay, zinc oxide and softeners in a masterbatch mix in a closed chamber mixer conventionally known as a Banbury mixer. Vulcanization properties were given to the rubbery stock by adding the sulfur and the accelerators to the masterbatch mix which has previously been cooled to room temperature and then replasticated in a closed mixer.

A sheet was prepared from this stock by calendering in a conventional manner and was adhered to the inner peripheral surface of the fabric body of an unvulcanized tire. The tire was then shaped and vulcanized in the conventional manner and when mounted on a wheel and inflated to 24 pounds per square inch air pressure performed satisfactory as a load bearing member. There was no substantial loss of air from the tire or separation of the innerliner from the tire body during operation of the tire.

To test for permeability to air, a compound according to the preferred formula was mixed on conventional rubber mixing machinery, formed into slabs having a dimension of 6 x 9 x .030 inch which were in turn cut into two test pieces 6 x 4.5 x .030 inch. One such piece was clamped to form a partition between two air chambers having a differential air pressure of 46 pounds. The test sample, air and air container were held at a temperature of 60° C. The change in air pressure between the chambers was observed over a period of two and one half hours and was calculated at the permeability expressed in cubic centimeters of air per second passing through a sample one centimeter thick and one centimeter wide, when the difference in pressure is 14.7 pounds per square inch or one bar.

In adhesion to other rubbery materials and air retention properties, the novel composition was satisfactory as may be seen by the following test results:

| | Novel Inner Liner | Prior Art Butyl Innerliner |
|---|---|---|
| Permeability: ccs./hr | .050 | .050 |
| Adhesion to tire body: | | |
| Hot_____lbs__ | 6 | 3 |
| Cold_____lbs__ | 15 | 6 |
| Tensile Strength | 1,875 | 1,025 |

Not only were the air retention characteristics of the novel composition equal to the prior art butyl type innerliner but the adhesion of the novel innerliner to the tire body was better as was the tensile strength.

Although in the preferred form of the invention, 45 parts of thermal type carbon black based on 100 parts by weight rubber hydrocarbon has been shown, it has been found that an innerliner according to the invention may be prepared by using from 30 to 55 parts of thermal type carbon black together with 40 to 75 parts of clay. Not only do compositions of the invention adhere well to the rubbery tire body but the air retention characteristics of innerliners fabricated therefrom when used in a tubeless tire are comparable in the air retention characteristics with butyl liners and in every respect commercially acceptable.

The carbon blacks preferably are thermal type carbon blacks which because of their structure and principally because of particle size are beneficial in combination with the other components of the composition. Examples of such blacks are "P-33" and "Thermax" sold by the R. T. Vanderbilt Company, 230 Park Avenue, New York 17, N.Y.

The preferred inert filler is high grade clay comprised substantially of hydrous aluminum silicate of fine particle size. An example of this material is "Suprex Clay" sold by the J. M. Huber Corporation, 342 Madison Avenue, New York 17, N. Y.

Among the synthetic rubbery polymeric materials useful in the invention with natural rubber are rubbery copolymers of butadiene and styrene, butadiene and acrylonitrile, as well as rubbery polymers of chlorobutadiene and other rubbery polymers and copolymers available to those working in the rubber art. At least 50% natural rubber based on the weight of rubber hydrocarbon present is necessary to obtain the benefits of the invention.

For vulcanizing the rubbery materials used in the invention many accelerators are known to the art. Among those available are the thiazoles, the dithiocarbamates, the thiuram sulfides, for example, benzothiazole disulfide, mercaptobenzothiazole, cyclohexylbenzothiazole sulfenamide and zinc dimethyl dithiocarbamate. Magnesium oxide among others is useful for accelerating the polychlorobutadiene type of polymers. Also available are the aldehydeamine and guanidine type accelerators such as formaldehyde ammonia and diphenylguanidine, and many more known to those versed in the art of rubber compounding.

Although the preferred modification of the invention has been shown by way of example, those skilled in the art will readily see that modification is possible within the scope of the invention by reference to the specification and the following claims.

I claim:

1. An air impervious flexible liner for a pneumatic tubeless tire comprised of a mixture of 100 parts by weight of rubbery polymeric materials of which at least 50 parts by weight is natural rubber and the balance of said rubbery polymeric materials is selected from the group consisting of rubbery copolymers of a major proportion of butadiene with a minor proportion of styrene, copolymers of butadiene with acrylonitrile and rubbery polymers of chlorobutadiene, with at least 30 parts by weight of soft thermal type carbon black and at least 40 parts by weight of clay.

2. An air impervious flexible liner for a pneumatic tubeless tire comprised of a mixture of 100 parts by weight of rubbery polymeric materials of which at least 50 parts by weight is natural rubber and the balance of said rubbery polymeric materials is selected from the group consisting of rubbery copolymers of a major proportion of butadiene with a minor proportion of styrene, copolymers of butadiene with acrylonitrile and rubbery polymers of chlorobutadiene, with from 30 to 55 parts by weight of soft thermal type carbon black and 40 to 75 parts by weight of clay.

3. An air impervious flexible liner for a pneumatic tubeless tire comprised of a mixture of 100 parts by weight of rubbery polymeric materials of which at least 50 parts by weight is natural rubber and the balance of said rubbery polymeric materials is selected from the group consisting of rubbery copolymers of a major proportion of butadiene with a minor proportion of styrene, copolymers of butadiene with acrylonitrile and rubbery polymers of chlorobutadiene, with about 45 parts by weight of soft thermal type carbon black and about 65 parts by weight of clay.

References Cited in the file of this patent

UNITED STATES PATENTS

| | | |
|---|---|---|
| 2,566,328 | Hessney et al. | Sept. 4, 1951 |
| 2,566,329 | Hessney et al. | Sept. 4, 1951 |
| 2,588,993 | Schroeder | Mar. 11, 1952 |
| 2,661,339 | Sparks et al. | Dec. 1, 1953 |
| 2,676,636 | Sarbach | Apr. 27, 1954 |
| 2,698,042 | Perkins | Dec. 28, 1954 |
| 2,731,060 | Rowe | Jan. 17, 1956 |
| 2,825,382 | Peterson et al. | Mar. 4, 1958 |

OTHER REFERENCES

Morris et al.: India Rubber World, November 1943, pages 150–152, 193.